United States Patent [19]
Olsen

[11] 3,789,658
[45] Feb. 5, 1974

[54] ENGINE PERFORMANCE ANALYZER

[75] Inventor: Dick Merlin Olsen, Pasadena, Calif.

[73] Assignee: Clayton Manufacturing Company, El Monte, Calif.

[22] Filed: Jan. 28, 1972

[21] Appl. No.: 221,613

[52] U.S. Cl. .............................. 73/117.3, 324/16 S
[51] Int. Cl. .......................................... G01m 15/00
[58] Field of Search ....... 73/117.3, 116, 117.2, 117; 324/115, 16 S

[56] References Cited
UNITED STATES PATENTS

| | | | |
|---|---|---|---|
| 3,650,149 | 3/1972 | Howes | 73/117.3 |
| 2,558,276 | 6/1951 | Simpson et al. | 324/115 |
| 3,446,070 | 5/1969 | Hickox | 116/136.5 X |
| 3,308,377 | 3/1967 | Lukso et al. | 324/115 |

Primary Examiner—Jerry W. Myracle
Attorney, Agent, or Firm—Jackson & Jones Law Corporation

[57] ABSTRACT

An internal combustion engine performance analyzer is described for simultaneously displaying certain operating characteristics, such as ignition waveform, horsepower output, etc., under controlled operating conditions. A plurality of probes are coupled to the engine to provide output signals representative of engine performance characteristics such as cylinder ignition, generator output, starter current, etc.. To provide output signals representative of additional operating characteristics, a dynamometer and an exhaust analyzer may also be coupled to the engine.

The analyzer includes an oscilloscope and at least one selectable scale test meter in which a rotatable drum positions one of six possible scales adjacent the meter indicator or pointer at a time. A multiple position program switch controls the drum position to provide the proper scale and couples selected output signals from the engine, dynamometer or exhaust analyzer to the meters and the oscilloscope for a selected test procedure. The program switch also couples one of several sweep signals to the oscilloscope so that signals, for example, representing the spark plug voltages of the cylinders may be displayed in a superimposed pattern or separated in a vertical or horizontal pattern on the oscilloscope. The program switch enables the operator to diagnosis an engine by simply rotating the switch through each of its positions and reading the values of the parameters under test on the scales positioned adjacent the meter indicators. The waveforms of a selected parameter such as ignition voltages, starter current, etc., are simultaneously displayed on the oscilloscope for each switch position.

28 Claims, 7 Drawing Figures

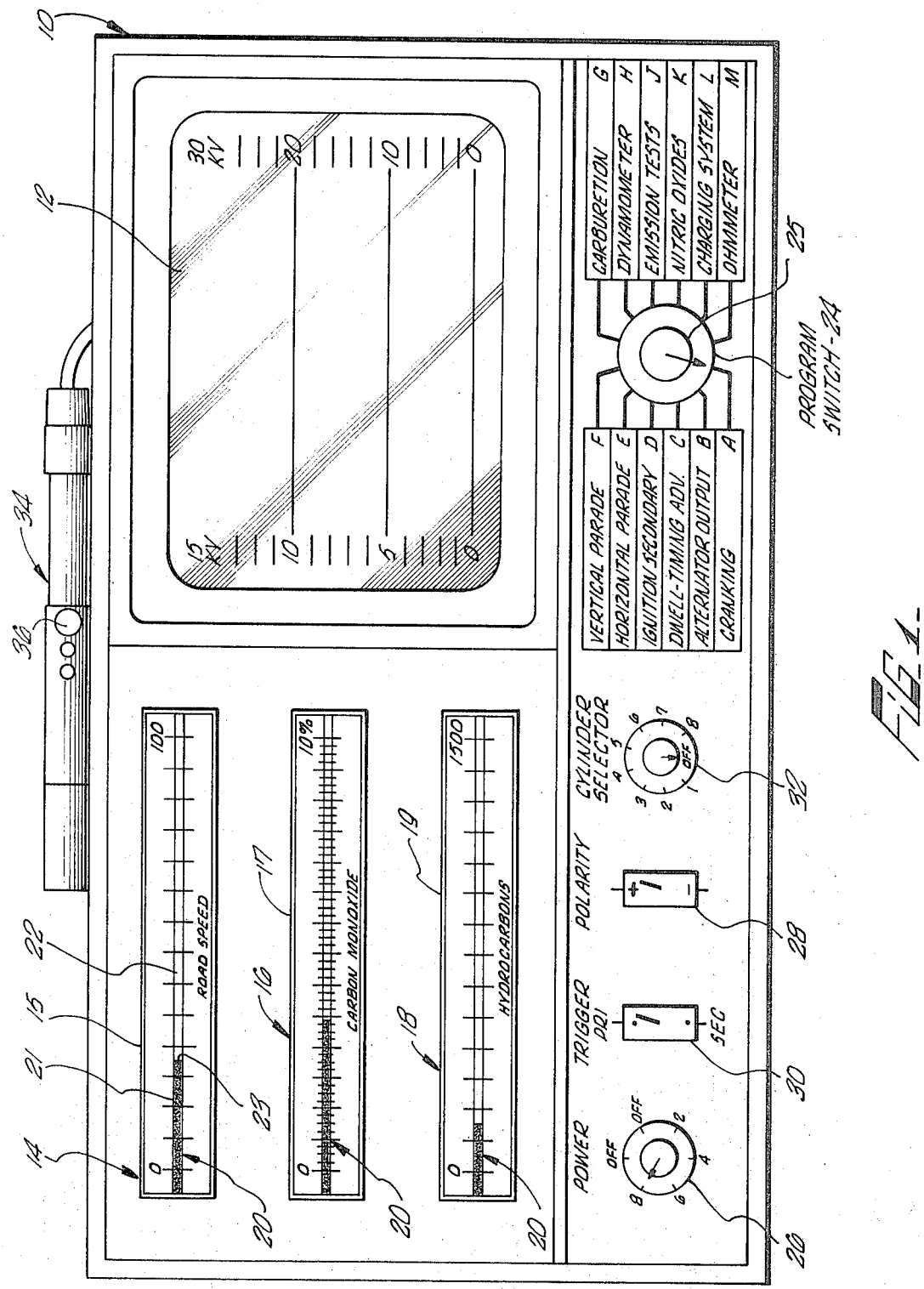

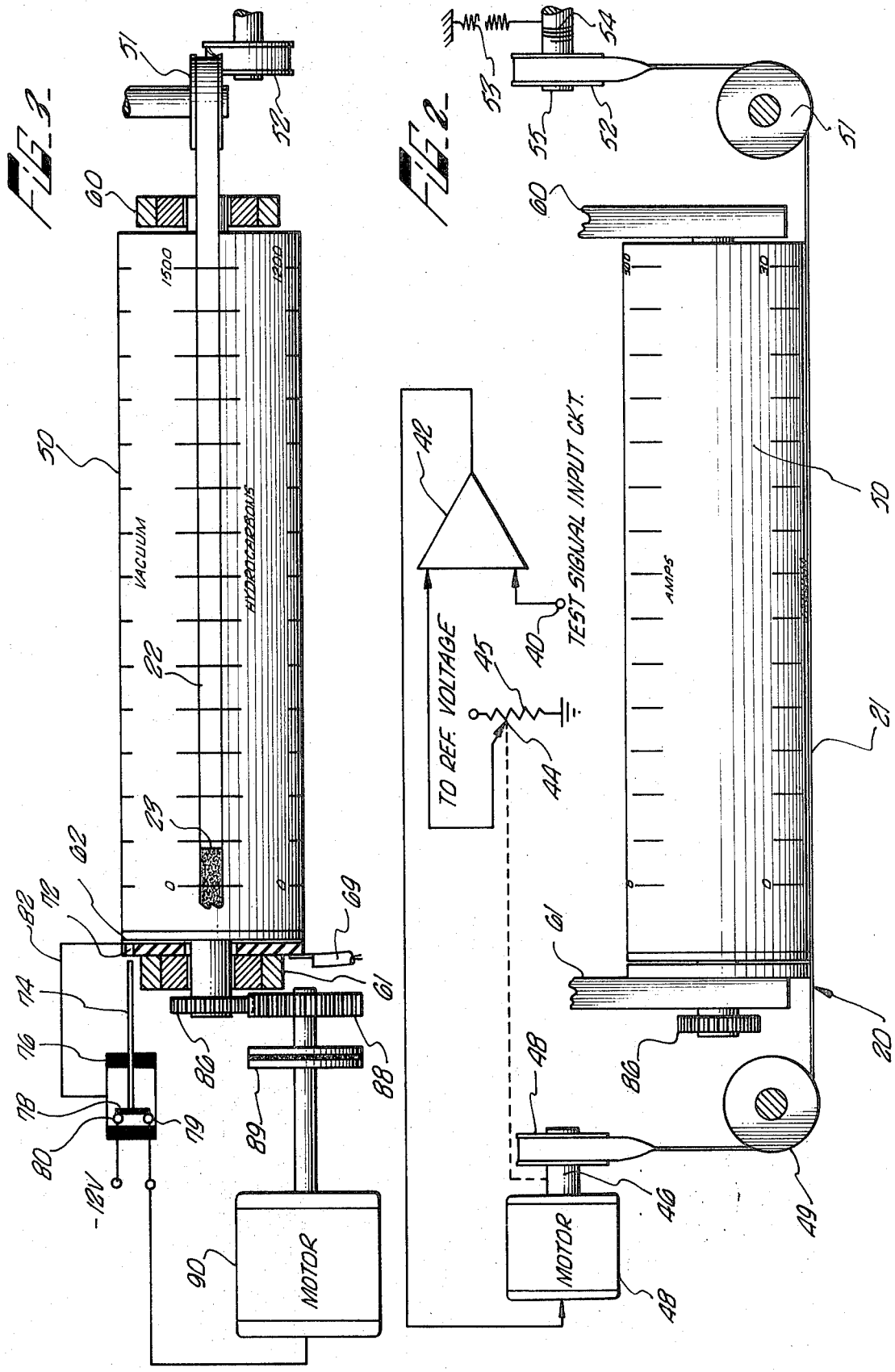

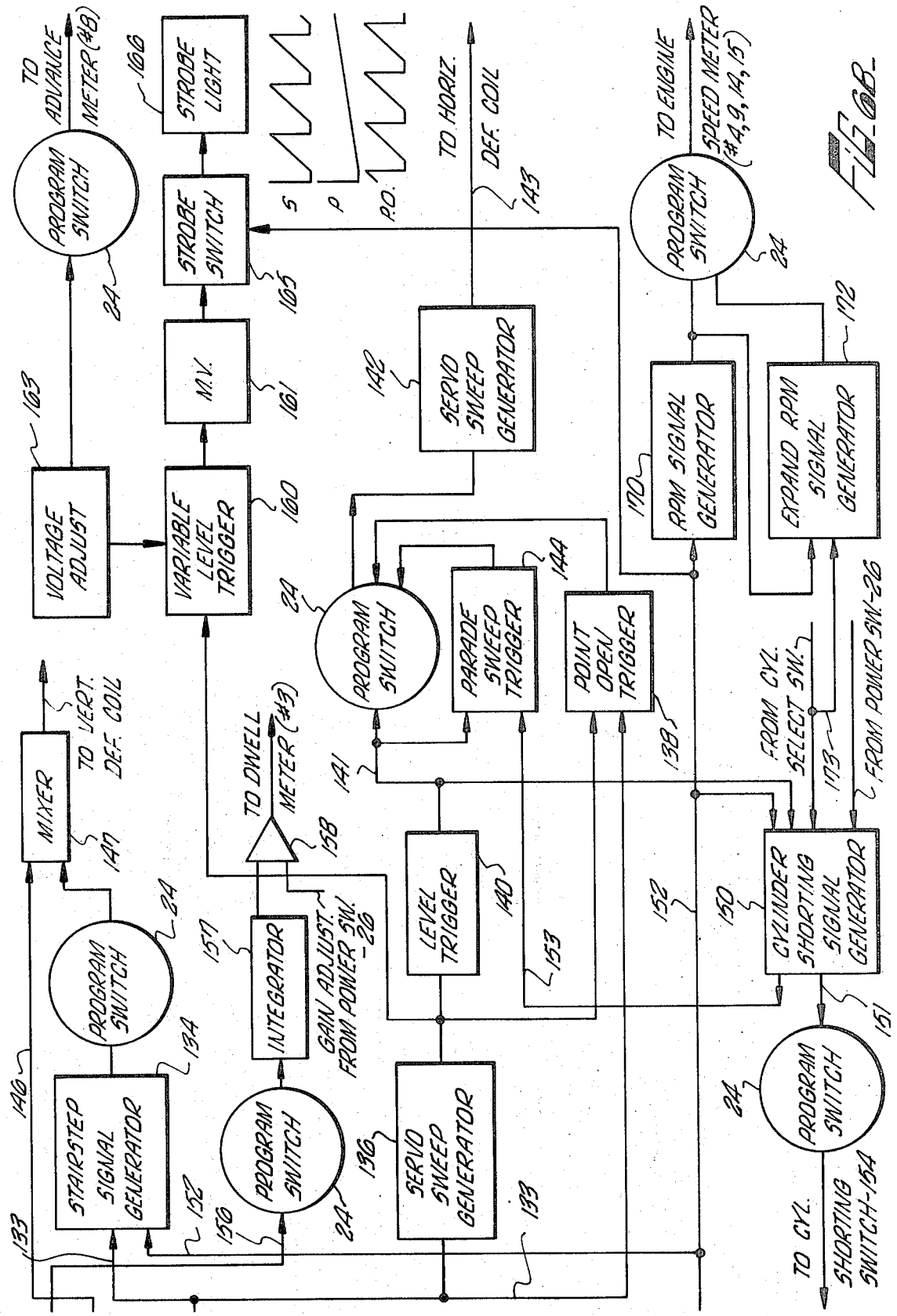

ENGINE PERFORMANCE ANALYZER

BACKGROUND OF THE INVENTION

1. Field of the Invention

This invention relates to an internal combustion engine analyzing system and more particularly to an electronic system for analyzing certain engine operating characteristics.

2. Description of the Prior Art

A number of electronic analyzers are available in the prior art to indicate various performance characteristics of internal combustion engines. Some of the analyzers are aimed particularly at a diagnostic analysis of the ignition system of automobile engines. Other analyzers include means for determining horsepower output at various engine or automobile road speeds and an analysis of the exhaust gases to determine the content of certain undesirable gases. These prior art devices generally employ a cathode ray tube oscilloscope to provide a visual display of certain test data such as spark plug voltage waveform. The prior art devices also employ one or more electric meters for measuring the voltage and/or current. Such electric meters generally utilize a d'Arsonval type movement in which a pointer is moved through a predetermined arc in response to the magnitude of the input voltage or current. A scale behind the pointer permits the operator to read the value of the parameter being measured. Since many parameters must be measured to determine engine performance as many as six different scales are positioned behind the pointers of each of the meters in the prior art analyzers.

It is often difficult for the test operator to correlate the proper scale with the parameter under test. Furthermore, the scales decrease in length toward the axis of the meter movement thereby decreasing the resolution of the meter. Loss of meter resolution requires larger and more costly meters if the analyzer is to enable the operator to adjust the timing and carburetion of the engine with sufficient accuracy to meet the present high standards of emission control. The meters are also difficult to read by the operator when he, of necessity, must be located at some distance from the analyzer, for example, in the car controlling the throttle. Furthermore, the pointers of such prior art meters are positioned at some distance from the scale providing paralax which further increases the problem of obtaining an accurate reading.

The prior art analyzers not only employ meters which are confusing and difficult to read, but include a large number of switches, potentiometers, etc., which must be set in the proper position for each test procedure. For example, the proper leads from the engine, dynamometer or exhaust analyzer must be coupled to the meters and the signal input circuit (vertical deflection coil) of the oscilloscope for each test procedure. Also the proper sweep voltage must be applied to the sweep circuit (horizontal deflection coil) of the oscilloscope to display the data in the proper return. The operation of such prior art analyzers requires highly trained personnel. Furthermore, the many adjustments and switch positions under the control of the operator provide a large margin for error.

SUMMARY OF THE INVENTION

The present invention overcomes the disadvantages of such prior art analyzers by providing an apparatus which is highly accurate and simple to operate. The apparatus includes a plurality of probes coupled to the engine to provide output signals representative of various engine performance characteristics. The apparatus also includes an oscilloscope which is provided with a signal input circuit and a sweep input circuit for providing a visual display of selected engine characteristics such as spark plug voltages, generator charging current, etc.. Sweep signal generating means are arranged to selectively generate one of a plurality of sweep voltages so that several signals may be displayed simultaneously on the oscilloscope in a superimposed, horizontally or vertically stacked pattern.

At least one selectable scale test meter is provided with a test signal input circuit and an indicator movable between two points in response to the applied signal to provide a measure thereof. The test meter further includes a rotatable drum carrying a plurality of individual scales on the periphery thereof with one scale positioned adjacent the indicator and between the two points at any one time. A scale selection circuit is included in the test meter with means responsive to signals applied to such circuit for rotating the drum to position a selected scale adjacent the indicator.

The analyzer is controlled by a multiple position program switch which has at least first, second and third contact means. The first contact means is coupled between selected probes and the test input circuit of the meter for applying an input signal to the meter representative of predetermined engine characteristics at selected switch positions. The second contact means is coupled between selected probes and the signal input circuit of the oscilloscope to provide a display representative of the selected probe output signals at selected switch positions. Means including the third contact means are provided for connecting the sweep generating means to the sweep input circuit of the oscilloscope and controlling the sweep output voltage to provide a selected sweep raster on the oscilloscope for each switch position. Scale selector means responsive to each position of the program switch are provided for applying signals to the meter scale selection circuit for causing the drum to position a selected scale adjacent the indicator for each switch position.

The analyzing apparatus of the present invention may be coupled to the engine with simple clips. Once the analyzer is initially adjusted to accommodate the number of engine cylinders, e.g., two, four, six or eight and the polarity of the battery supply, the program switch may then be sequenced through its multiple positions to provide a complete engine diagnosis. The values of the parameters being tested may be readily read on the single scale positioned behind the meter indicators for each test procedure. The waveforms of the parameters under observation, such as spark plug voltages, are also displayed in the proper pattern on the oscilloscope for each test procedure. The flexibility of the analyzer may be increased by adding a trigger switch for selecting the primary or secondary ignition coil pulses for visual display and a cylinder select shorting switch to permit the cylinder balance to be readily checked. The analyzer may be operated by relatively untrained personnel to provide an accurate engine diagnosis in a minimum of time. The analyzer is described in more detail in connection with the accompanying drawings.

BRIEF DESCRIPTION OF THE DRAWINGS

FIG. 1 is a front elevation of an analyzer in accordance with the present invention;

FIG. 2 is a partial plan view in schematic form of a selectable scale test meter for use in the apparatus of FIG. 1;

FIG. 3 is a partial elevational view of the selectable scale test meter;

FIGS. 6A and 6B comprise a block diagram of the electronic circuitry for use in the apparatus of FIG. 1.

DESCRIPTION OF THE PREFERRED EMBODIMENT

Figure 4:
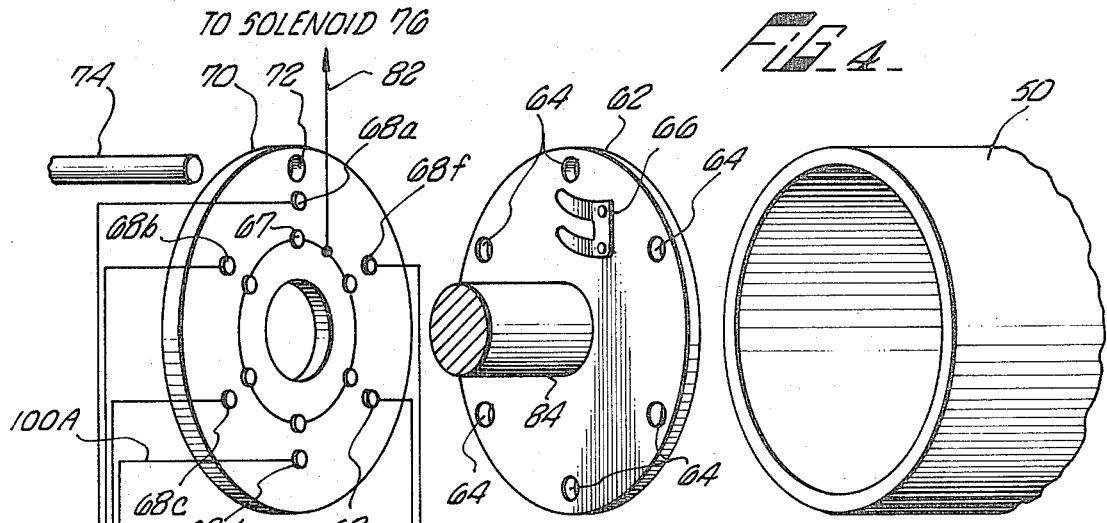
FIG. 4 is an exploded view of one end of the test meter of FIGS. 2 and 3.

Referring now to FIG. 1, the apparatus of the present invention includes a housing 10, an oscilloscope 12 and three selectable scale test meters 14, 16 and 18 mounted in the housing with a selected scale of each meter positioned within windows 15, 17 and 19. Each meter includes a movable indicator in the form of a Mylar tape 20 having a colored portion 21 and a transparent portion 22 with the junction 23 functioning as the indicator to provide a measure of the input signal as will be described in more detail. A program switch 24 is provided with a manually actuable knob 25 for positioning the switch in any selected position from A-L as illustrated.

The diagnostic apparatus includes a power switch 26 for selecting the proper number of cylinders for the engine under test, e.g., two, four, six or eight. A polarity switch 28 correlates the polarity of the diagnostic apparatus to the polarity connection of the battery of the engine under test. A trigger switch 30 is provided for permitting the pulses from the primary or secondary winding of the ignition coil to be displayed on the oscilloscope 12. A cylinder selector switch 32 permits the operator to short out one of the engine cylinders at a time to test the power contribution of individual cylinders as will be explained in more detail. A strobe light unit 34 including a potentiometer adjustment knob 36 is provided for making conventional timing measurements. The term engine as used herein includes such accessories as the battery, starter, generator and ignition system.

FIGS. 2, 3 and 4 illustrate a selectable scale test meter that may be utilized in the apparatus of the present invention. A selectable scale test meter of this type is the subject matter of a copending application "METER WITH ELECTRICALLY SELECTABLE SCALES," Ser. No. 221,667, filed Jan. 28, 1972 by Gordon L. Brock. Each test meter 14, 16 and 18 includes a test signal input circuit 40 for applying a test signal to one input of a differential amplifier 42 as shown in FIG. 2. The other input to the differential amplifier is obtained from a movable contact or wiper 44 of a potentiometer 45. The potentiometer 45 is connected between a reference voltage and ground as illustrated. The wiper 44 is coupled to a shaft 46 of a servo motor 48 which is energized by the output from the amplifier 42. The output shaft 46 of the motor is also connected to a tape reel 48 on which is wound a length of the Mylar tape 20. The Mylar tape is twisted through 90°, passed around a guide roller 49, across the side of a translucent plastic drum 50 which is exposed through one of the windows 15, 17 or 19, around a guide roller 51 and to a rotatable storage reel 52. A spring 53 is fixed at one end relative to the housing 10 and is connected at the other end to a flexible cord 54 which is wound around a shaft 55 carrying the reel 52.

In operation, a signal applied to the input circuit 40 energizes the motor 48 which turns the shaft 46 until the voltage on the wiper 44 is equal to the voltage applied to the input circuit 40. Typically the input signal may vary between 0 and 10 volts to provide a rotation of the shaft 46 and reel 48 sufficient to cause the indicator 23 of the tape 20 to travel between two predetermined points located at each end of the drum 50. The spring 53 maintains a constant tension on the tape 20 so the tape is wound on the take up reel 52 at the same rate that it is unwound from the supply reel 48 and vice versa. The tape 20 is positioned almost in contact with the drum 50 to eliminate paralax.

The drum 50 of the test meter is hollow as is best illustrated in FIG. 4 and carries six scales spaced at 60° intervals along its periphery. The drum is rotatably mounted by end supports 60 and 61 which are secured to the housing 10 in any suitable manner. The drum 50 carries an end plate 62 (FIG. 4) which is provided with six bores 64 spaced at 60° intervals. The plate 62 also carries a bifurcated flexible contact 66 which wipes stationary contacts 67 and 68 on a fixed plate 70. The plate 70 further includes a bore 72 which receives an indexing pin 74 driven by the armature of a solenoid 76 as shown in FIG. 3. The pin 74 also carries a movable contact 78 which engages stationary contacts 79 and 80 when the solenoid armature is not energized as illustrated. The solenoid 76 is energized through a line 82 which is connected to the contacts 67 on the fixed plate 70. The contact 80 is connected to a suitable bias source such as minus 12 volts. The drum 50 is rotated by a shaft 84 which is connected at one end to the plate 62 and at the other end to a gear 86. The gear 86 is driven by a gear 88 coupled to a motor 90 via a suitable clutch 89. The motor 90 is energized by the contacts 78-80 when the solenoid 76 is not energized.

Figure 5:
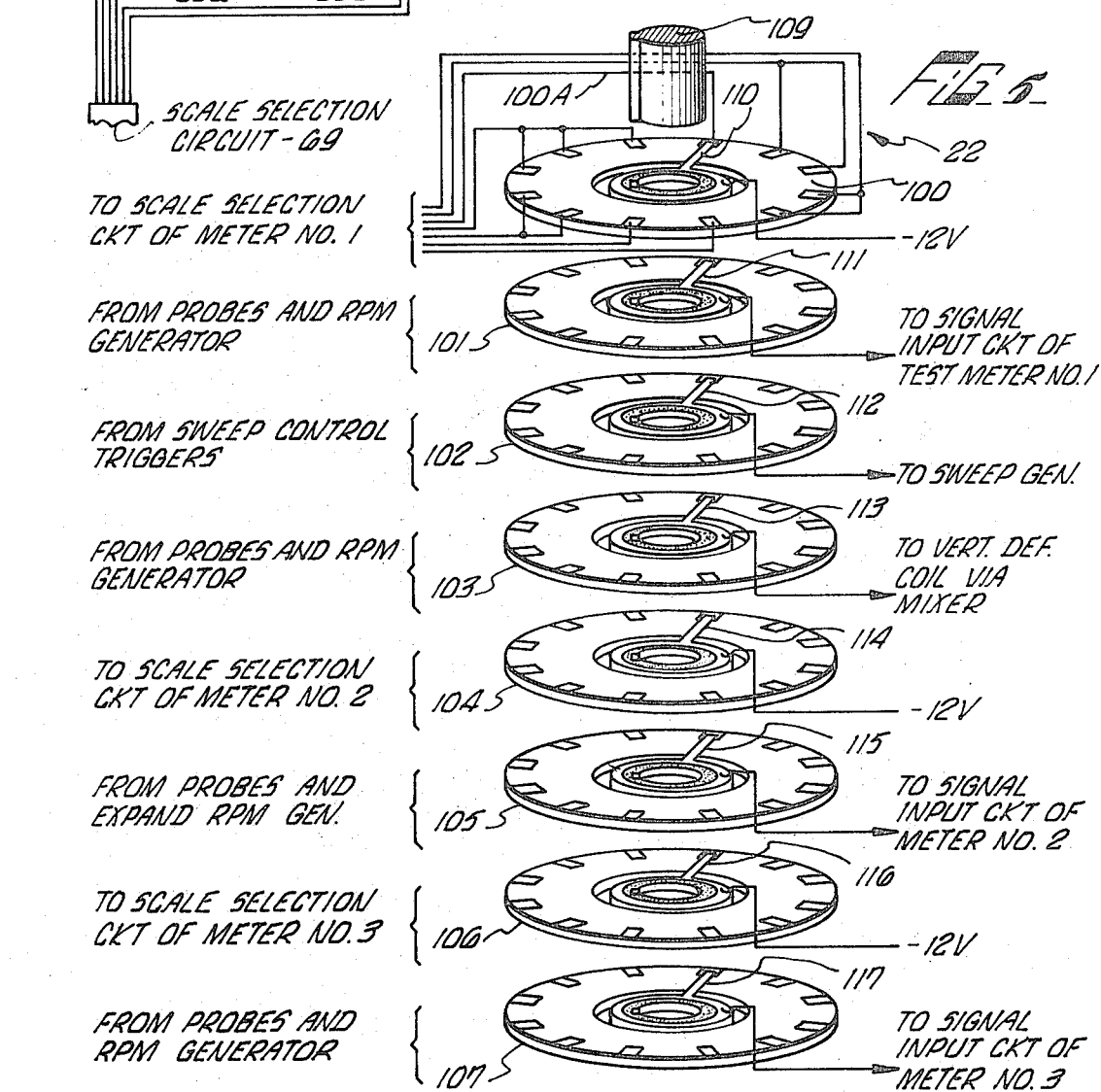
FIG. 5 is an enlarged partial perspective view of a program switch for use in the apparatus of FIG. 1.

The solenoid 76 is controlled by the program switch 22 which is illustrated in FIG. 5 and comprises a plurality of stationary contact discs 100-107 carrying fixed contacts associated with each switch position and a rotatable shaft 109 which carries movable contacts 110-117. The movable contacts 110-117 are insulated from the shaft 109 and are connected by spring contacts as shown to bias sources, the signal input circuits of the three test motors, the sweep generator and the vertical deflection coil of the oscilloscope, as noted on the drawing. The stationary contacts of the program switch are coupled to the probes, speed signal or RPM generator and to the scale selection circuits of the three meters as indicated in FIG. 5.

The position of the drum 50 of each meter is controlled by the program switch 24. For example, when the program switch is rotated by the position shown in FIG. 5, the rotating contact 110 engages a fixed contact on the disc 100 and energizes the line 100A with −12 volts. The line 100A forms a portion of the scale selection circuit 69 of the meter and is connected, for example, to one or more of the fixed contacts 68a–f. Assume that line 100A is connected to fixed contact 68d. At this time, the solenoid 76 is not energized and the movable contact 78 is in the position illustrated in FIG. 3 which energizes the motor 90. The motor 90 rotates the drum 50 until the bifurcated contact 66 engages the contact 68d and the corresponding contact 67. At this time, the solenoid 76 is energized and drives the indexing pin 74 and movable contact 78 toward the drum to deenergize the motor 90. The pin 74 is driven through the bores 72 and 64 and stops rotation of the drum 50 with the proper scale positioned adjacent the indicator 21. The solenoid 76 remains energized until the program switch is rotated to a new position at which time the drum 50 is again rotated as described above.

Figure 6A:
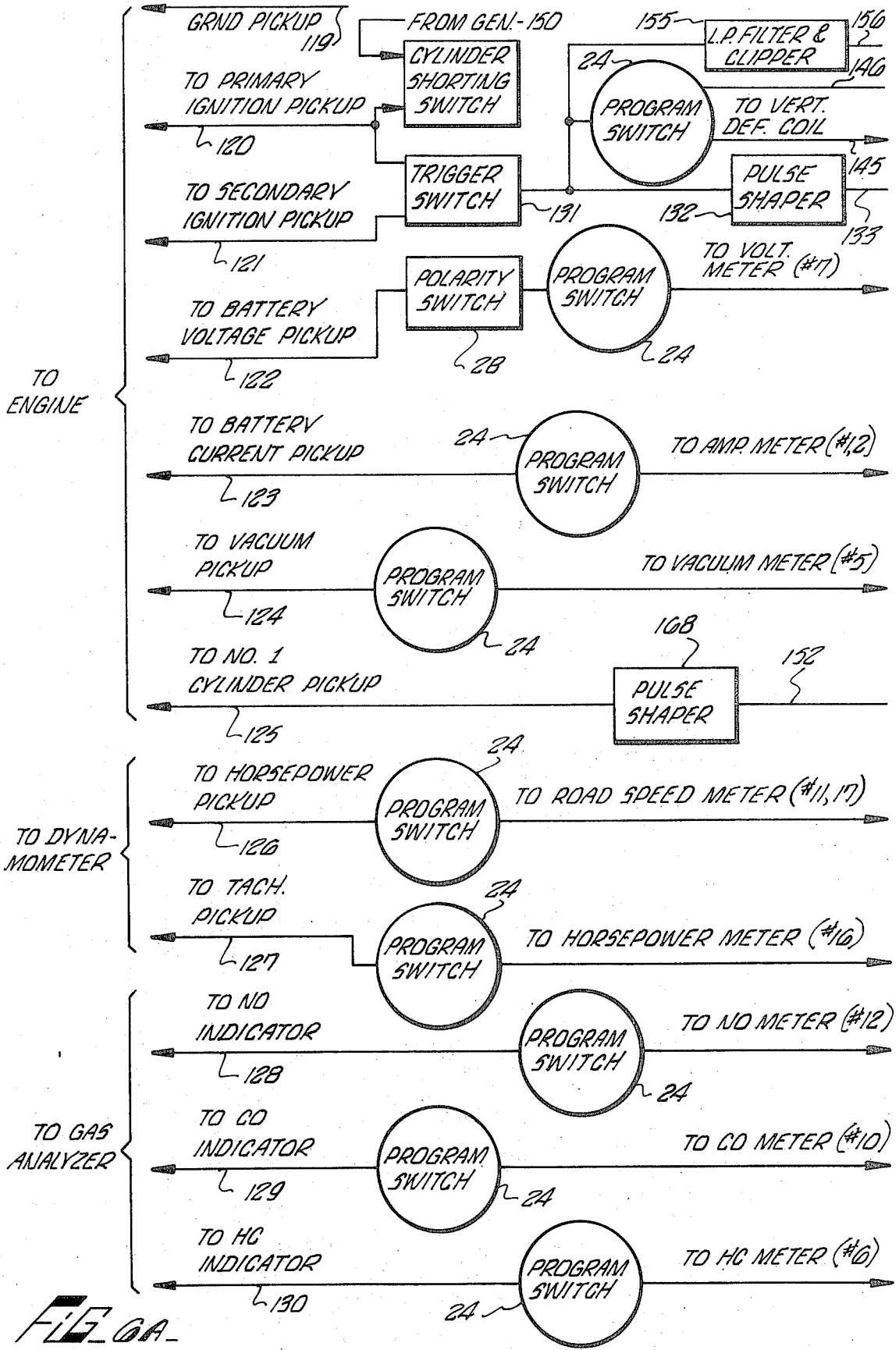

Referring now to FIGS. 6A and B, the electronic portion of the analyzer is illustrated in block form. The electronic apparatus is described in more detail in the copending application of Peter A. Howes, Ser. No. 792,382, filed on Jan. 21, 1969 now U.S. Pat. No. 3,650,149 entitled "ENGINE IGNITION AND POWER ANALYZER" and assigned to the assignee of this application. The electronic system requires the use of only seven input connections to the engine under test, including ground pickup 119. Leads 120 and 121 are connected to the primary and secondary windings of the ignition coil (not shown) to provide signals representative of the ignition pulses induced across the primary and secondary windings, respectively. A battery voltage lead 122 and a current lead 123 are provided for obtaining signals representing the battery terminal voltage and battery current. A vacuum pickup lead 124 is connected to a vacuum transducer (not shown) coupled to the engine manifold to provide a signal representative of the manifold vacuum. A lead 125 is connected to the number one spark plug to provide pulses representative of the firing times for the number one cylinder.

A horsepower lead 126 and a tachometer lead 127 are connected to a dynamometer (not shown) which may be of a conventional type to provide signals representative of the horsepower delivered at the rear wheels of an automobile, and road speed, respectively. The signals supplied on lead 126 need not be representative of the horsepower output but may be representative of any desired performance characteristic such as torque, etc.. Leads 128, 129 and 130 are connected to a suitable gas analyzer (not shown) to provide signals representative of the nitric oxide, carbon monoxide and hydrocarbon content of the engine exhaust. The signals from the leads 122–124 and 126–130 are coupled to the signal input circuits of the three test meters described in more detail. The six possible meter scales are numbered 1–6, 7–12 and 13–18 for meters 1, 2 and 3, respectively. The meter scale which is used to provide a measure of the tested parameter is noted on the drawing and can be readily correlated with the program switch position in the chart on pages 17 and 18. The output signals on certain of the leads 120–130 are also coupled to the signal input circuit of the oscilloscope via the program switch.

The oscilloscope sweep voltages are initiated by the primary or the secondary ignition signals selected by the trigger switch 13 and applied by the program switch 24 to a pulse shaper 132. The pulses on line 132 are applied via line 133 to a servo sweep generator 136. The pulse shaper 132 (FIG. 6B) converts each ignition pulse to a narrow square wave pulse which triggers the servo sweep generator 136 to provide a ramp voltage of constant amplitude independent of the pulse repetition rate. A level trigger 140 detects a predetermined amplitude in the output ramp voltage from the generator 136 and produces an output signal on line 141 in response thereto which precedes or anticipates the ignition pulse of the next cylinder to fire. The output signal on line 141 is applied by the program switch to a second servo sweep generator 142 to provide a superimposed raster for the oscilloscope, that is, a sawtooth sweep signal of constant amplitude which is synchronized with each output signal from the level trigger 140, i.e., the ignition in each cylinder. In this mode, the raster results in the display of the primary or secondary ignition signals in either a superimposed pattern or in a vertical stacked pattern as is described in more detail in the copending application Ser. No. 792,382.

To provide a parade raster in which the spark plug voltages, for example, are displayed in a horizontally stacked pattern on the oscilloscope, the parade sweep trigger 144 is connected between the line 141 and an additional stationary contact of the program switch 24. The parade sweep trigger 144 includes an additional input via line 153 from a cylinder shorting signal generator 150 which may be in the form of a ring counter having stages equal in number to the cylinders of the engine under test. The cylinder shorting signal generator provides a square wave output signal on output line 151 in advance of or anticipatory of the ignition firing signal of a selected cylinder for repressing the ignition of the selected cylinder as is described in more detail in copending application Ser. No. 792,382. The output signal from the generator 151 which is applied to the parade sweep trigger 144 by line 153 is the anticipatory firing signal for cylinder No. 1. The parade sweep trigger includes a gate which passes only the output signals from level trigger 140 which are coincident with ignition in the No. 1 cylinder. Thus the trigger 144 supplies one input pulse to the servo sweep generator 142 for each cycle of the engine. The resulting output sweep voltage from the sweep generator 142 brackets the firing intervals of all cylinders during one complete cycle for displaying ignition signals in a horizontally stacked or parade pattern.

The point open trigger 138 receives as one input the signal from sweep generator 136 and another input from the secondary ignition lead 121 via the pulse shaper 132. The output from the point open trigger 138 is a square wave pulse delayed to coincide with the point opening times for each cylinder. Thus instead of starting the sweep just prior to the time the points are closed, the sweep of the oscilloscope is started when the points are opened. The point opening wave forms are displayed in a vertical parade or superimposed pattern.

The program switch 24 applies one of three trigger pulses to the servo sweep generator 142 to provide one of three possible sweep rasters, e.g., a ramp voltage synchronized with and slightly in advance of each cylinder ignition. A ramp voltage synchronized with and slightly in advance of each No. 1 cylinder ignition and a ramp voltage synchronized with each point opening transition. The three possible sweep voltages are illustrated above the output line 143 of servo sweep generator 142 wherein S represents the superimposed sweep (level trigger 140 connected directly to generator 142), P represents the parade sweep (trigger 144) and P.O. represents the point open sweep (point open trigger 138).

Either the primary or secondary ignition waveform may be applied directly to the vertical deflection coil of the oscilloscope via line 145 through the program switch 24 to provide a superimposed or horizontally stacked display. A vertically stacked display of the primary or secondary ignition waveform is obtained by means of a mixer 147. The mixer 147 receives a stair step signal having a number of voltage increments or steps equal to the number of cylinders of the engine under test from the stair step signal generator 134 when the program switch is rotated to provide a vertical parade pattern. The stair step signal generator may be of the type discussed in copending application Ser. No. 792,382 in which a ring counter having a number of stages equal to the number of cylinders under test is advanced by each firing pulse from line 133. The output of the various stages of the ring counter may be connected to ground through weighted resistors to provide a stair step output voltage in a well known manner. The stair step signal generator 134 is reset by pulses from the No. 1 cylinder pickup, via line 152.

To measure the power contribution of each cylinder, the generator 150 is provided to generate anticipatory shorting signals to short out the points and thereby repress the ignition of a selected cylinder so that the engine RPM drop for each shorted cylinder may be noted. The generator 150 may be in the form of a ring counter having, for example, 8 stages as is illustrated in copending application Ser. No. 792,382. The ring counter counts the output signals from the level trigger 140 and provides square wave output signals on line 151 which bracket the firing times of the selected cylinder. The cylinder select switch 32 is rotated to select the cylinder to be shorted. The cylinder shorting signal generator also receives an input from the power switch 26 which determines the number of operative stages of the ring counter in accordance with the number of cylinders in the engine under test. The four stages of the ring counter will be utilized for a four cylinder engine, etc. The ring counter may be reset by pulses from the No. 1 cylinder pickup via line 152.

To determine the dwell time of the points, the output signal from the trigger switch 131 is applied by a low pass filter and clipper 155 via line 156 through the program switch to an integrator 157. The output signal from the filter and clipper 155 is in the form of a square wave having a duration proportional to the interval that the points are closed. The integrator 157 provides a d.c. output signal through an adjustable gain amplifier 158 to the dwell meter or the input signal circuit of meter 1, scale No. 3, when the program switch is in position C. The gain of the amplifier 158 is controlled by the power switch 26 in accordance with the number of cylinders of the engine under test. For example, the feedback resistance of the amplifier 158 may be varied in a conventional manner to control the amplification of the signal applied to the dwell meter and provide a meter movement representative of the percentage of dwell time of the points.

The timing advance of the engine ignition is determined by applying the output from the sweep generator 136 to a variable level trigger 160 which provides an output signal to a multivibrator 161 when the level of the ramp voltage from the generator 136 reaches a value determined by a voltage adjust circuit 163 which may be a potentiometer. The voltage adjust circuit 163 is controlled by the manually operated knob 36 on the strobe unit 34 by turning the knob 36 until the strobe light coincides with the engine timing mark. The setting of the voltage adjust potentiometer 163 provides a d.c. output signal which is applied through the program switch to the advance meter or meter 2, scale No. 8, when the program switch is in position C. The output of the multivibrator 161 is applied through a strobe switch 165 to fire the strobe light 166.

The strobe switch 165 may be conveniently actuated by the knob 36 when the voltage adjust circuit 163 is at the end of its adjustment. Actuation of the switch 165 applies narrow square wave pulses from the No. 1 cylinder via pulse shaper 168 to the strobe light. When the strobe light 166 is actuated by the No. 1 cylinder firing pulse, the position of the engine advance is read in the conventional manner by means of a fixed scale on the engine block. The engine advance can be read either by the conventional method of illuminating the engine reference mark with the No. 1 cylinder ignition pulse or by controlling the time that the strobe is fired by means of the voltage adjustment potentiometer 163 until the illuminated mark is aligned with a fixed reference corresponding with the top dead center position of one of the pistons such as the number one piston.

Engine speed is derived from an RPM signal generator 170 which receives pulses from the No. 1 cylinder pickup via line 152 and provides a d.c. output signal proportional to the repetition rate of such pulses or engine speed. The output of the RPM signal generator 170 is applied via the program switch to meters 1 or 3 depending upon the position of the switch as is illustrated in the chart on pages 17 and 18. An expand RPM signal generator 172 is connected to the output of the RPM signal generator 170 for comparing the engine RPM as each cylinder is shorted with the engine speed prior to cylinder shorting. The expand RPM generator 172 stores a signal representative of the engine speed prior to the activation of the cylinder select switch 32. When the cylinder select switch is operated to short out a selected cylinder, the expand RPM generator is also activated via line 173 and compares the stored signal with the new output of the RPM signal generator 170 to provide an output to the RPM meter (meter 2, Scale No. 9) through program switch 24 which is representative of the actual drop in engine RPM as each cylinder is shorted.

To make a complete engine diagnosis, it is only necessary for the operator to connect leads 119–130 to the engine and the dynamometer and gas analyzer, if used. The program switch is then sequenced through each position A–M.

The following chart identifies each scale on the meters 1, 2 and 3 and the oscilloscope sweep raster for each program switch position.

| Switch position | Scales | | | Oscilloscope | |
|---|---|---|---|---|---|
| | Meter 1 | Meter 2 | Meter 3 | Raster | Pattern |
| A | 1 | 7 | 13 | Superimposed | Squashed primary. |
| B | 2 | 7 | 14 | Parade | Alternator. |
| C | 3 | 8 | 14 | Superimposed | Primary. |
| D | 3 | 8 | 14 | ........do........ | Secondary. |
| E | 3 | 9 | 14 | Parade | 15/30 KV pri./sec. |
| F | 4 | 9 | 14 | Pts. open | Secondary vertical parade. |
| G | 5 | 10 | 15 | Superimposed | Secondary. |
| H | 5 | 11 | 16 | Parade | Secondary vertical parade. |
| J | 6 | 10 | 17 | ........do........ | Secondary 15KV. |
| K | 6 | 12 | 17 | Superimposed | Secondary. |
| L | 2 | 7 | 15 | Parade | Alternator. |
| M | 2 | 7 | 18 | None | |

Meter scales for meters 1, 2 and 3 are as shown below:

METER 1

| SCALE NO. | | | |
|---|---|---|---|
| 1 | 0 | AMPS | 500 |
| 2 | 0 | AMPS | 120 |
| 3 | 0 | DWELL | 90° |
| 4 | 0 | Engine Idle Speed | 1200 RPM |
| 5 | 0 | VACUUM | 30 |
| 6 | 0 | HC | 1500 RPM |

METER 2

| SCALE NO. | | | |
|---|---|---|---|
| 7 | 0 | VOLTAGE | 20 volts |
| 8 | 0 | ADVANCE | 90° |
| 9 | 0 | RPM CHANGE | 400 |
| 10 | 0 | CO | 10% |
| 11 | 0 | ROAD SPEED | 100 MPH |
| 12 | 0 | NO | 5000 RPM |

METER 3

| SCALE NO. | | | |
|---|---|---|---|
| 13 | 0 | VOLTAGE DROP | 2 volts |
| 14 | 0 | ENGINE SPEED | 5000 RPM |
| 15 | 0 | ENGINE SPEED | 10000 RPM |
| 16 | 0 | ROAD HORSEPOWER | 200 |
| 17 | 0 | ROAD SPEED | 100 MPH |
| 18 | 0 | OHMMETER | $\alpha$ |

In position A the engine is tested for starter current via lead 123 and battery terminal voltage via lead 122 when the engine is turned over by the starter and the values of such parameters are read on meter 1 and 2. The oscilloscope displays the squashed primary voltage waveform since the primary winding is shorted to ground through an appropriate resistor during the cranking test. The voltage drop across the ignition primary points with the points closed may also be measured on meter 3.

In position B, the performance of the alternator or generator is tested and may be read on meter 3 after the cranking test is completed since the battery has been discharged during the cranking test. The output current of the alternator is read on meter 1, via lead 123 with the engine speed set, for example, at 2,500 RPM on meter 3. The battery terminal voltage is again read on meter 2 and the scale for this meter has remained unchanged. The alternator output voltage waveform is displayed on the oscilloscope.

In position C the basic ignition tests are performed. The dwell time in degrees of cylinder travel is read on meter 1 via amplifier output 158 with the engine speed set at about 800 RPM on meter 3. The basic timing is checked by means of the strobe light either fired by the No. 1 cylinder ignition pulses or by means of the voltage adjust potentiometer 163 as discussed previously. When the potentiometer 163 is used, the timing advance may be read out on meter 2 with the engine speed set, for example, at 2,000 RPM on meter 3.

In test position D, the waveforms of the secondary ignition pulses are displayed in superimposed pattern on the oscilloscope to permit the operator to identify a particular type of ignition problem, for example, wide gap, open circuits, series resistance, fouled plugs, etc.. The meter scales have not changed from the previous position.

With the program switch in position E, the primary or secondary ignition waveforms are displayed on the oscilloscope in a horizontal parade pattern. At this time, the voltage requirements for each plug in engine firing order from left to right on the oscilloscope may be noted by the operator. Faulty spark plugs may be readily detected. The entire ignition system output may be tested by use of the 30KV scale position on the oscilloscope by means of a switch (not shown). Only the scale of meter 2 is changed in position E to read RPM change. In this position or in position F, the cylinder balance test may be made by shorting out one cylinder at a time by means of the cylinder select switch 32 and noting the RPM change on meter 2.

When the program switch is turned to position F, the oscilloscope displays the waveform of the secondary ignition pattern in firing order from top to bottom in a vertical parade. In this position, the scope raster will be the point open sweep discussed previously, and the stair step signal generator 134 will be connected by the program switch to the mixer 147 to provide the vertical stacked pattern on the oscilloscope. In position F, the scale of meter 1 is changed to scale No. 4 showing engine idle speed.

In position G, the program switch changes the scales of meters 1, 2 and 3 to scales Nos. 5, 10 and 15 and connects the vacuum lead 124, the carbon monoxide monitor lead 129 and the RPM generator 170 to the signal input circuits of meters 1, 2 and 3 respectively. The oscilloscope is provided with the superimposed sweep and the secondary ignition pulses are displayed thereon in a superimposed pattern. The carburetion system is tested in this position either dynamically (by use of a dynamometer) or under a free running condition.

Turning the program switch to position H changes the scales to Nos. 11 and 16 on meters 1 and 2, respectively to provide a measurement of road speed and road horsepower. The sweep raster is the parade mode and the secondary ignition pulses are displayed in a vertical parade with the stair step signal generator 134 providing vertical separation of the ignition pulses. In this position, the road horsepower at given engine speeds may be determined.

In position J, the scales of the meters are changed as illustrated in the above chart so that meter 1 provides a reading of the hydrocarbon content and of the exhaust gases and meter 2 measures the carbon monoxide content. Meter 3 provides a measurement of road speed by coupling the dynamometer tachometer lead 127 to the signal input circuit of meter 3. In position J, the oscilloscope is provided with the parade raster and the secondary ignition pulses are displayed in a horizontally separated pattern. If desired, the "on time" of the solenoid or hydraulically actuated fuel injector valves of fuel injector engines may also be monitored in position J. To monitor the additional parameters requires the use of additional coupling probes for providing signals representative of the time that the fuel injector valves are open. The "on time" of such valves may be displayed on the oscilloscope in a superimposed pattern (with two valves generally being monitored at one time).

In position K, only the scale of meter 2 changes to permit the operator to determine the nitric oxide content of the engine exhaust. The oscilloscope is provided with a superimposed sweep signal and the secondary ignition pulses are displayed in a superimposed pattern.

In switch position L, the performance of the charging system of the engine is again measured. The engine has been run at accelerated speeds during the previous tests and the battery should be at a state of charge reflecting the voltage regulator setting. The alternator waveform is displayed on the oscilloscope by a parade raster with the engine running at a given RPM. The alternator voltage output should be in the form of flattened humps. Each of the meter scales is changed in switch position L with meter 1 connected to read charging current in amperes on scale No. 2. Meter 2 is connected to read battery terminal voltage on scale No. 7 and meter 3 is connected to the RPM signal generator 170 to provide a reading of engine speed.

Position M of the program switch changes only on the scale of meter 3 to permit the resistance of spark plug wires, etc., to be measured in ohms. The oscilloscope is not utilized in this position.

Many modifications to the preferred embodiment of this invention will be apparent to those skilled in the art. For example, the number of selectable scale meters is a matter of choice. Two such meters will provide considerable latitude in setting up testing procedures. The testing procedures programmed into the switch 24 may, of course, be varied. Furthermore, the selectable scale meters may be modified, for example, by the use of one motor to first drive the drum to position a selected scale and then drive the tape to provide a measure of the input signal. The number of fixed and movable contacts on the program switch may be varied to accommodate the measurement and display of more or less engine parameters. The electronic system for generating the sweep and cylinder shorting signals may also be modified.

There has thus been described a unique electronic analyzer for internal combustion engines which provides highly accurate measurement of engine parameters by relatively unskilled personnel.

What is claimed is:

1. In an apparatus for analyzing the operation of a multiple cylinder internal combustion engine, the combination which comprises:
 a plurality of probe pickup leads adapted to be coupled to the engine to provide output signals representative of engine performance characteristics;
 an oscilloscope having a signal input circuit and a sweep input circuit;
 sweep signal generating means for selectively generating one of a plurality of sweep voltages;
 at least one selectable scale test meter having a test signal input circuit, an indicator movable between two points in response to the signal applied to the input circuit to provide a measure of said input signal, a rotatable drum having a plurality of individual scales spaced around the periphery thereof with one scale positioned adjacent the indicator and between the two points at a time, a scale selection circuit and means responsive to signals applied to the scale selection circuit for rotating the drum to position a selected scale adjacent the indicator;
 a multiple position program switch having at least first, second and third contact means, the first contact means being coupled between selected probe pickup leads and the test input circuit of the meter for applying input signals to the meter representative of predetermined engine characteristics at selected switch positions, the second contact means being coupled between selected probes and the signal input circuit of the oscilloscope to provide a display of signals representative of the selected probe pickup output signals for selected switch positions;
 means including the third contact means for connecting the sweep generating means to the sweep input circuit of the oscilloscope and controlling the sweep output voltage to provide a selected sweep raster on the oscilloscope for each switch position, the program switch being arranged to provide simultaneous operation of the first, second and third contact means; and
 scale selector means responsive to each position of the program switch for applying signals to the meter scale selection circuit for causing the drum to position a selected scale adjacent the indicator for each switch position.

2. The combination as defined in claim 1 wherein the indicator is a reference mark on a flexible member and the test meter includes means for moving the flexible member across one side of the drum in response to the signal applied to the input circuit of the meter.

3. The combination as defined in claim 2 wherein the means for moving the flexible member is a servo mechanism.

4. The combination as defined in claim 1 including a second selectable scale test meter having a test signal input circuit, an indicator movable between two points in response to the signal applied to the input circuit to provide a measure of said input signal, a rotatable drum having a plurality of individual scales spaced around the periphery thereof with one scale positioned adjacent the indicator and between the two points at a time, a scale selection circuit and means responsive to signals applied to the scale selection circuit for rotating the drum to position a selected scale adjacent the indicator, and wherein the program switch includes fourth contact means, the fourth contact means being coupled between selected probes and the test input circuit of the second meter for applying input signals to the meter representative of the output signals from individual probes at selected switch positions and further including means responsive to each position of the program switch for applying signals to the meter scale selector circuit of the second meter for causing the drum to position a selected scale adjacent the indicator for each switch position.

5. The combination as defined in claim 1 wherein the scale selector means comprises a source of potential and an additional contact means of the program switch, the additional contact means being connected between the source of potential and the scale selection circuit for applying predetermined signals to the scale selection circuit for each switch position.

6. The combination as defined in claim 5 wherein each contact means comprises a stationary contact associated with each switch position and a rotatable contact which engages one stationary contact for each switch position.

7. The combination as defined in claim 6 wherein the meter scale selection circuit comprises a motor and a solenoid actuated indexing member for rotating the drum to position the selected scale.

8. The combination as defined in claim 7 including a dynamometer coupled to the engine and having at least two output circuits for providing signals representative of speed and engine performance characteristic and wherein the third and fourth contact means couples the output signals from the dynamometer to the signal input circuits of the first and second meters at selected positions of the program switch.

9. The combination as defined in claim 6 including a gas analyzer coupled to the engine exhaust for providing output signals representative of the quantities of selected gases and wherein the first and fourth contact means couple the output signals of the gas analyzer to the test signal input circuits of the first and second meters for a selected switch position.

10. The combination as defined in claim 6 including a cylinder select switch having a switch position for each cylinder of the engine under test and means responsive to the position of the cylinder select switch for opening the ignition in the selected cylinder.

11. In an apparatus for analyzing the operation of a multiple cylinder combustion engine provided with an ignition coil having a primary and secondary winding, a starter, a battery, and a generating system, the combination which comprises:

an ignition probe pickup means adapted to be coupled to the primary and/or secondary winding for providing signals representative of the ignition firing pulses, a battery voltage probe pickup for providing a signal representative of the battery terminal voltage, a battery current pickup for providing a signal representative of battery current, a cylinder number one pickup probe for providing a signal representative of the ignition time of the number one cylinder, an oscilloscope having a signal input circuit and a sweep input circuit, sweep signal generating means for selectively generating one of a plurality of sweep voltages, first and second selectable scale test meters, each meter having a test signal input circuit, an indicator movable between two points in response to the signal applied to the input circuit to provide a measure of the input signal, a rotatable drum having a plurality of individual scales spaced around the periphery thereof with one scale positioned adjacent the indicator and between the two points at a time, a scale selection circuit and means responsive to signals applied to the scale selection circuit for rotating the drum to position a selected scale adjacent the indicator, a multiple position program switch having first, second, third, fourth, fifth and sixth contact means, the first and second contact means being coupled between the test input circuits of the first and second meters and selected ones of the probe pickups for applying input signals to the meters representative of predetermined engine characteristics at selected switching positions, means including the third and fourth contact means for applying signals to the scale selection circuits of the first and second meters to rotate the drums thereof to position a selected scale adjacent the respective indicators for each switch position, means connecting the fifth contact means in series relationship between selected probe pickups and the signal input circuit of the oscilloscope to provide a display of signals representative of the selected probe output signals for selected switch positions, means including the sixth contact means for connecting the sweep input circuit of the oscilloscope to the sweep input circuit of the oscilloscope and for applying a selected sweep voltage thereto for each switch position.

12. The combination as defined in claim 11 wherein each of the first, second, third, fourth, fifth and sixth contact means comprise a plurality of fixed contacts and a rotating contact which sequentially engages one stationary contact for each switch position.

13. The combination as defined in claim 12 including a dynamometer coupled to the engine and having at least two output circuits for providing signals representative of speed and performance characteristic and wherein the first and second contact means couple the output signals from the dynamometer to the signal input circuits of the first and second meters at a selected switch position of the program switch.

14. The combination as defined in claim 13 including a gas analyzer coupled to the engine exhaust and having three output signals representative of the hydrocarbon, carbon monoxide and nitric oxide content of the exhaust gas and wherein the first and second contact means couple the output signals from the exhaust gas analyzer to the signal input circuits of the first and second meters at selected positions of the program switch.

15. The combination as defined in claim 13 wherein the first and second contact means couple the battery voltage and current probes to the signal input circuits of the first and second test meters at one switch position.

16. The combination as defined in claim 15 including pulse shaping and integrating means for providing a dwell signal proportional to the dwell time of the points and wherein the first or second contact means couples said dwell signal to the test input circuit of one of the first and second test meters at a selected switch position.

17. The combination as defined in claim 16 including means for providing a signal representative of the ignition advance and wherein the first or second contact means couples the advance signal to the test input circuit of the first or second meter at a selected switch position.

18. The combination as defined in claim 12 wherein the engine includes a distributor with points which close and open to provide the ignition pulses and wherein the sweep signal generating means selectively generates a first sweep voltage synchronized with each cylinder ignition, a second sweep voltage synchronized with each ignition in cylinder number one and a third sweep voltage synchronized with the point opening transition for each cylinder.

19. The combination as defined in claim 12 including a gas analyzer coupled to the engine exhaust and having three output signals representative of the hydrocarbon, carbon monoxide and nitric oxide content of the exhaust gas and wherein the first and second contact means couple the output signals from the exhaust gas analyzer to the signal input circuits of the first and second meters at selected positions of the program switch.

20. The combination as defined in claim 12 wherein the first and second contact means couple the battery voltage and current probes to the signal input circuits of the first and second test meters at one switch position.

21. The combination as defined in claim 11 wherein the indicator is a reference mark on a flexible member and the test meter includes means for moving the flexible member across one side of the drum in response to the signal applied to the input circuit of the meter.

22. The combination as defined in claim 21 wherein the flexible member is a tape having a transparent portion and a colored portion with the transition between the two portions forming the indicator.

23. The combination as defined in claim 22 wherein the means for moving the tape past the drum includes a motor and a reel connected to the motor for winding or unwinding one end of the tape thereon, means responsive to the shaft position of the motor for providing a shaft position signal representative of the motor shaft position and means responsive to the difference signal between the test signal and the shaft position signal of a respective test meter for controlling the motor.

24. In an apparatus for analyzing the operation of a multiple cylinder internal combustion engine, the combination which comprises:
a plurality of probe pickup leads adapted to be coupled to the engine to provide output signals representative of engine performance characteristics;
an oscilloscope having a signal input circuit and a sweep input circuit;
sweep signal generating means for selectively generating one of a plurality of sweep voltages;
at least one selectable scale test meter having a test signal input circuit, an indicator movable between two points in response to the signal applied to the input circuit to provide a measure of said input signal, a moveable scale member carrying a plurality of individual spaced scales thereon with one scale positioned adjacent the indicator and between the two points at a time, a scale selection circuit and means responsive to signals applied to the scale selection circuit for moving the scale member to position a selected scale adjacent the indicator;
a multiple position program switch having at least first, second and third contact means, the first contact means being coupled between selected probe pickup leads and the test input circuit of the meter for applying input signals to the meter representative of predetermined engine characteristics at selected switch positions, the second contact means being coupled between selected probes and the signal input circuit of the oscilloscope to provide a display of signals representative of the selected probe pickup output signals for selected switch positions;
means including the third contact means for connecting the sweep generating means to the sweep input circuit of the oscilloscope and controlling the sweep output voltage to provide a selected sweep raster on the oscilloscope for each switch position; and
scale selector means responsive to each position of the program switch for applying signals to the meter scale selection circuit for causing the scale member to position a selected scale adjacent the indicator for each switch position.

25. The combination as defined in claim 24 including a second selectable scale test meter and wherein the program switch includes fourth contact means, the fourth contact means being coupled between selected probes and the test input circuit of the second meter for applying input signals to the meter representative of the output signals from individual probes at selected switch positions and further including means responsive to each position of the program switch for applying signals to the meter scale selector circuit of the second meter for causing the scale member to position a selected scale adjacent the indicator for each switch position.

26. The combination as defined in claim 25 including a third selectable scale test meter and wherein the program switch includes fifth contact means, the fifth contact means being coupled between selected probes and the test input circuit of the third meter for applying input signals to the meter representative of the output signals from individual probes at selected switch positions and further including means responsive to each position of the program switch for applying signals to the meter scale selector circuit of the third meter for causing the scale member to position a selected scale adjacent the indicator for each switch position.

27. The combination as defined in claim 25 wherein the movable scale member of each meter is a drum having a plurality of scales positioned around the periphery thereof.

28. The combination as defined in claim 27 wherein each contact means comprises a stationary contact associated with each switch position and a rotatable contact which engages one stationary contact for each switch position.

* * * * *